United States Patent [19]
Barringer

[11] Patent Number: 6,072,984
[45] Date of Patent: *Jun. 6, 2000

[54] APPARATUS FOR MONITORING CABLE TELEVISION SYSTEM REMOTE EQUIPMENT PERFORMANCE AND STATUS USING A CELL MODEM

[75] Inventor: David Barringer, Milford, Ohio

[73] Assignee: Location Science Corporation, Milford, Ohio

[ * ] Notice: This patent is subject to a terminal disclaimer.

[21] Appl. No.: 08/946,057

[22] Filed: Oct. 7, 1997

Related U.S. Application Data

[63] Continuation of application No. 08/549,300, Oct. 27, 1995, Pat. No. 5,675,371.

[51] Int. Cl.[7] .................................................... H04N 7/16
[52] U.S. Cl. ............................. 455/6.1; 455/9; 455/423; 348/6
[58] Field of Search .................................. 348/12, 13, 7, 348/6, 10, 192, 193; 455/3.2, 4.2, 5.1, 6.1, 6.2, 6.3, 420, 423, 466, 9

[56] References Cited

U.S. PATENT DOCUMENTS

| | | | |
|---|---|---|---|
| 5,555,015 | 9/1996 | Aguayo, Jr. et al. | 348/6 |
| 5,590,173 | 12/1996 | Beasley | 379/58 |
| 5,638,422 | 6/1997 | Roman | 379/58 |
| 5,675,371 | 10/1997 | Barringer | 348/6 |
| 5,699,176 | 12/1997 | Cohen | 359/118 |

*Primary Examiner*—Chris Grant
*Attorney, Agent, or Firm*—Michael P. Fortkort; Mayer, Fortkort & Williams, LLC

[57] ABSTRACT

A wireless remote data sensor is disclosed for use in the cable television industry. It senses the status of equipment in the field, such as battery backup power equipment, amplifiers, pilot and signal level monitors, and voltage level for powering active equipment, and transmits the status information using a low data rate cellular data service known as Cellemetry. It also allows the cable system operator to switch each power supply to a backup power source and back remotely for conditioning and battery capacity measurement. Cellemetry uses the forward and reverse control channels of the AMPS cellular network to communicate 32 bit data packets. Included in the sensor are a DC-to-DC converter, external power transformer or other power source, analog-to-digital converter(s), digital on-off sense input(s); a control microprocessor, a bi-directional connector for external programming, a bi-directional connection to a Cellemetry modem, a Cellemetry modem, and a cellular antenna, all of which are enclosed in an environmentally appropriate case. In addition, the present invetion minimizes the number of MINs required by cycling through a series of formats of the data signal so that more than 32 bits of data can be sent, although at different times.

25 Claims, 5 Drawing Sheets

32 BIT ESN

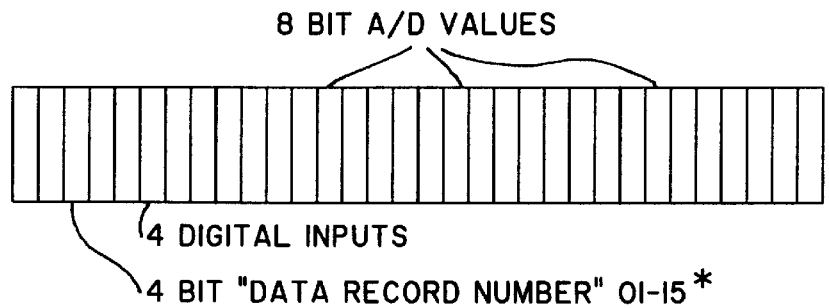

8 BIT A/D VALUES

4 DIGITAL INPUTS

4 BIT "DATA RECORD NUMBER" 01-15*

IF RECORD - 01 THEN
   DIGITAL 0 - ON BATTERIES / ON A.C.
   DIGITAL 1 = TAMPER ALARM
   DIGITAL 2 = OVERTEMPERATURE ALARM
   DIGITAL 3 = UNDERTEMPERATURE ALARM
   ANALOG 0 = TOTAL BATTERY VOLTAGE
   ANALOG 1 = BATTERY CHARGING CURRENT
   ANALOG 2 = INPUT A.C. VOLTAGE

IF RECORD = 02 THEN
   DIGITAL 0 - ON BATTERIES / ON A.C.
   DIGITAL 1 - TAMPER ALARM
   DIGITAL 2 = OVERTEMPERATURE ALARM
   DIGITAL 3 = UNDERTEMPERATURE ALARM
   ANALOG 0 = OUTPUT A.C. VOLTAGE
   ANALOG 1 = OUTPUT A.C. CURRENT
   ANALOG 2 =

IF RECORD = 03 THEN
   DIGITAL 0 = ON BATTERIES / ON A.C.
   DIGITAL 1 = TAMPER ALARM
   DIGITAL 2 = OVERTEMPERATURE ALARM
   DIGITAL 3 = UNDERTEMPERATURE ALARM
   ANALOG 0 = LOW END PILOT TONE AMPLITUDE
   ANALOG 1 = HIGH END PILOT TONE AMPLITUDE
   ANALOG 2 =

*RECORD 00 SKIPPED ENSURING ESN
 DOES NOT EVER EQUAL 00 00 00 00.

APPARATUS FOR MONITORING CABLE TELEVISION SYSTEM REMOTE EQUIPMENT PERFORMANCE AND STATUS USING A CELL MODEM

This application is a continuation of application Ser. No. 08/549,300 filed on Oct. 27, 1995, now U.S. Pat. No. 5,675,371.

FIELD OF THE INVENTION

The present invention relates generally to methods and apparatuses for remote data sensing, and more particularly, to a method and apparatus for remote data sensing used for measuring status information from equipment within the cable television industry "outside-plant" (referred to in the industry as the "plant"), including, but not limited to, the battery backup system and invertor, and for communicating that status to a central monitoring location at the main facility.

DESCRIPTION OF THE PRIOR ART

Existing sensing devices for the cable television industry transmit status information back to the central monitoring facility via frequency multiplex schemes over the same coaxial cable that carries the television signals. This status information includes information such as: battery life indicators, cable continuity alarms, etc. Sending this data via the cable itself reduces the bandwidth available to the operator to send video signals to the customer, and frequently yields poor or unreliable results due to the accumulation of noise within the cable. Failures in these sensor transmitters can add noise to the cable, which degrades the picture quality. Since the cable is primarily intended for one-way signal flow from the central facility to the users, returning data from the cable to the central facility is not a simple task because the cable does not easily accommodate reverse channel information flow. Thus, there is a need for a simple and cost efficient way for returning status information from the cable plant to the central facility.

In a unrelated field, recent developments in the cellular telephone industry have created a service for transmitting extremely small amounts of data via the cellular telephone network, using the Advanced Mobile Phone System (AMPS) cellular telephone network. This low data rate service is known as Cellemetry, which is a combination of the terms "Cellular" and "telemetry." Because of the very low overall data rate and the generally "one-way" nature of the communication, many applications will not be able to benefit from Cellemetry. Finding applications that can utilize a data rate this slow is difficult. The data is sent out over the cellular control channels in 32 bit packets, at an over-the-air rate of 10 kilobits per second. The cellular carrier will not authorize applications that send more than about 1 packet every 15 minutes, for fear of interfering with their primary revenue stream, voice telephone calls. Therefore, the aggregate bandwidth of the Cellemetry channel is quite low in today's terms—on the order of 10 milli-bits per second, i.e., 0.010 bits per second, or about 1 bit every 100 seconds.

To this date, a variety of applications for using this Cellemetry service have been proposed. These applications fall into two basic categories: alarms and meter counts. In the alarm applications, contacts are monitored, and fire and motion detectors report "all good" or "something wrong" results. In the meter applications, a sensor outputs a pulse representing the occurrence of a certain event, and the total count is transmitted periodically (monthly, daily) via the Cellemetry service. These meter applications include counting each time a kilowatt-hour of electricity, gallon of water, cubic foot of gas, can of pop, candy bar, or copier page is used or sold. To date, the only things that have been proposed to be monitored by Cellemetry have been contact closures, "counts", "clicks", or "revolutions." The applications are severely limited in the type of information they can send due to the severely restricted bandwidth available.

To transmit this data using the Cellemetry service, Cellemetry modems have been developed by Phillips for BellSouth, and are now available from Standard Communications of Sunnyvale, Calif. These modems operate in a meter mode for accepting electronic pulses that increment a built-in counter in the modem. A nonvolatile memory in the modem contains the current count and the modem will transmit that count when queried by the user. These Cellemetry modems also include an RS-232 port for accepting a digital 32-bit signal.

The data transmitted via Cellemetry is communicated over the 800 MHz cellular control channel frequencies to the Mobile Telephone Switching Office (MTSO) where the data is separated from other (voice) telephone registration information. The data is then sent by land-line modems to a central monitoring station.

The present invention is therefore directed to the problem of developing a remote sensing apparatus for sensing and transmitting cable television system remote equipment performance and status, which is cost effective and simple, yet returns the data in near real time. Furthermore, the present invention is directed to the problem of developing a method and apparatus for remote sensing that can transmit a large number of sample points, as well controlling a contact closure output to control the battery discharge function in the battery backup and invertor units in the cable plant.

SUMMARY OF THE INVENTION

The present invention solves this problem by providing a remote sensor for sensing and collecting both analog and digital information from the field equipment used in the cable television industry, and a Cellemetry modem for transmitting the collected analog and digital information using Cellemetry service, which also accepts commands from an operator.

The present invention allows the cable television industry to forgo installation of reverse transmission equipment to transmit information back down the cable from the terminal end (near the subscribers) to the head end (at the satellite feed) by using a data path external to the cable. This increases the available bandwidth for video delivery to customers, and eliminates any noise that such reverse transmission equipment might introduce into the television signal, thereby increasing cable television customers' satisfaction.

The present invention also provides the capability to alert the operator when a particular power supply has lost AC power, so that a timely response to the affected equipment can be achieved. Currently, the fact that a supply has lost AC is communicated by an disgruntled subscriber about two hours after the event, immediately after the battery supply has discharged.

One advantageous embodiment of the present invention provides for capability in the remote data sensor to receive a command to transmit the current status of any one of its sensed inputs. Different "telephone numbers" can be assigned to reply with different data packets. By prompting the remote sensor to transmit a certain set of parameters, more bandwidth can be provided to the actual data, and additional bits to identify the data need not be reserved. Depending on the needs of the cellular carrier to minimize number utilization, the data can also be sent "packet-multiplexed." Each successive call to the same number will reply with different data packets, each containing both data and information about the origin or format of the data.

Another advantageous embodiment of the present invention provides for the capability in the remote sensor to automatically transmit the current status of the analog sensed inputs when any of the sensed inputs exceeds a pre-defined maximum or minimum threshold, or when any of the digital inputs changes state, from off to on or on to off.

A final advantageous embodiment of the present invention provides for the capability in the remote sensor to switch a relay output from one state to another. This is accomplished using a separate "change relay state" telephone number. For a short period of time after this telephone number is detected on the forward control channel, a call to the main equipment's number will cause the output to change state. This output can be connected to a power supply input forcing the "AC lost" state in the power supply. If, after a certain period of time, the battery voltage drops below a certain voltage (determined by the cable operator, battery and power supply manufacturer), the batteries are in need of replacement. This is currently done on a quarterly basis, with a cable technician visiting each site and performing the one to two hour test. Thus, the present invention removes the requirement for such regular visits by a cable technician.

BRIEF DESCRIPTION OF THE DRAWINGS

FIG. 5 shows the format of the 32 bit ESN in the one embodiment of the present invention, showing maximum conservation of telephone numbers.

DETAILED DESCRIPTION

Figure 1:
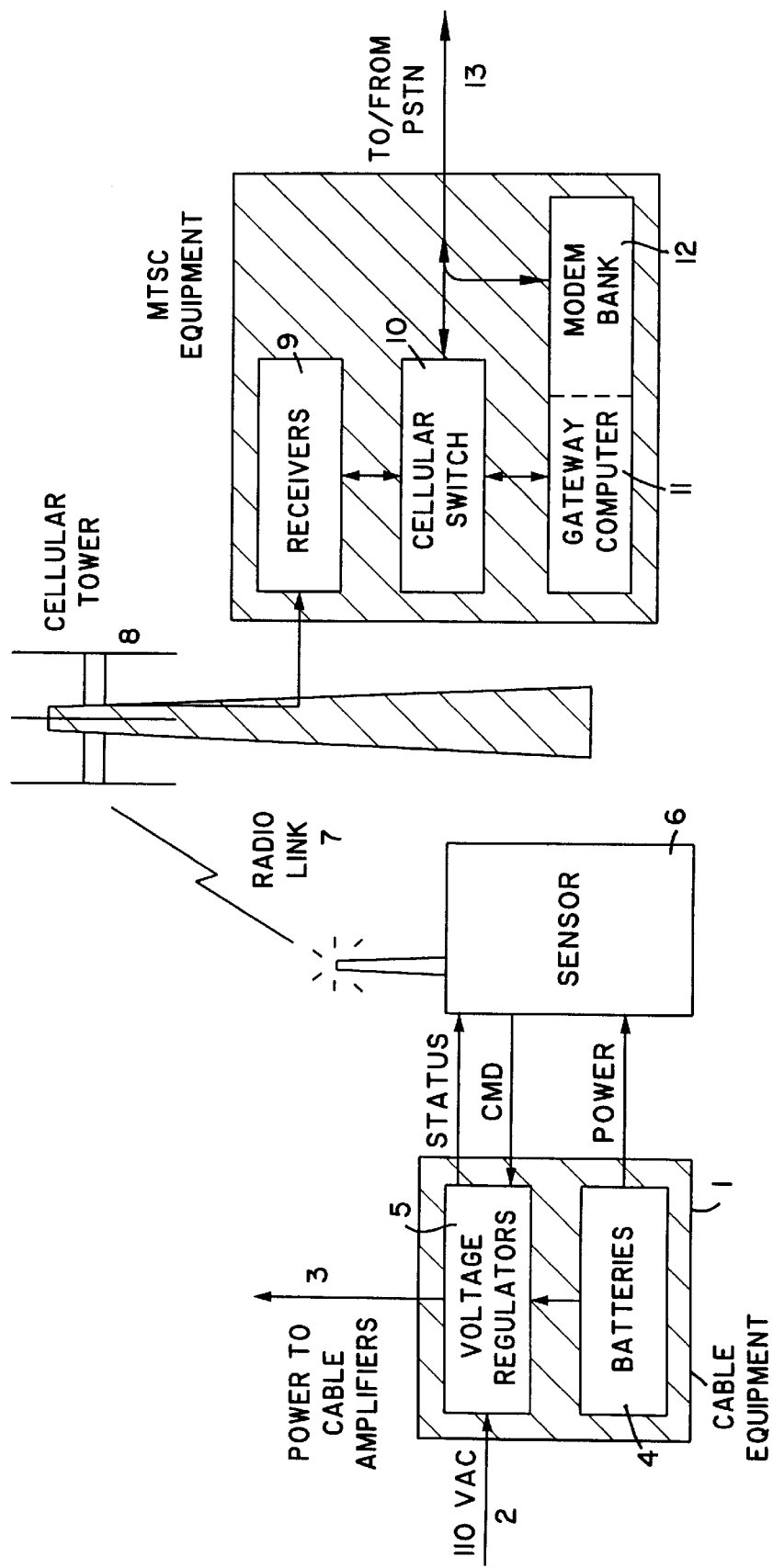
FIG. 1 is a block diagram showing how one embodiment of the present invention fits into the overall system for status and control.

The present invention specifically provides the capability of transmitting digital and analog values in a Cellemetry channel, despite the extremely limited bandwidth available to users of this service. In addition, the present invention permits monitoring of a fluctuating value—one that can go both up and down over time. For example, the present invention permits monitoring a battery's state of charge, which is a slowly varying amount, and combines it with the alarm information of a loss of AC power.

The present invention recognizes the particular application of Cellemetry to the problem of monitoring status in the Cable TV plant, which is ideally suited for Cellemetry. The present invention is an out-of-band solution to a problem that has been traditionally solved in-band. The cable companies recognize that they do not have infinite bandwidth on their cables. By using communication bandwidth outside of their cable, they can more efficiently utilize what bandwidth they have available. Any bandwidth they use for sending system data back to the head end is bandwidth that cannot be used to send video signals out to subscribers. In addition, this solution enhances the reliability, since the return path is not the same as the forward one.

Cellemetry is a system by which small amounts of data can be communicated from remote, wireless transceivers to a customer's facility. The existing cellular infrastructure is exploited in a manner in which the original developers of the AMPS did not foresee.

Cellular systems typically utilize one channel in each cell, called a "control channel" to receive requests for service from subscriber units to call other subscriber units and to instruct subscriber units (also referred to herein as "mobile telephones") to tune to a frequency pair of a selected "voice channel" wherein a two-way (duplex) conversation may take place. The control channel continuously receives and transmits data and is the channel to which a mobile telephone automatically tunes when not in a voice conversational state.

Each AMPS mobile telephone has two values associated with it: a Mobile Identification Number (MIN) and an Electronic Serial Number (ESN). The ESN is a 32 bit value programmed into the telephone's internal software at the factory and is not adjustable. The MIN is a standard 10 digit telephone number, assigned by the cellular carrier and associated with a specific ESN when the telephone is sold or activated. When a mobile call is made, the cellular telephone transmits its MIN and ESN to identify itself to the cellular system for billing purposes. Notably, the fraud problems carriers are currently trying to deal with have come about because people have found out how to change both the MIN and ESN in their telephones to match other, legitimate customer's values.

Cellemetry modems are standard mobile telephone modules from which the voice processing parts have been removed, and it is physically unable to make a voice call. The MIN is assigned by the cellular carrier, and is generally a number which cannot be dialed on a standard telephone, for example, one with a "000" for an area code. When this number is paged over the control channel, the receiving unit responds by transmitting its MIN and ESN. In a standard mobile telephone, the ESN would be fixed at the factory and be unalterable. In Cellemetry modems, the ESN is actually the data packet. The Cellemetry modem transmits the data in the exact format (data rate, error correcting bits, redundancy, modulation, and carrier frequency) that the cellular carrier is expecting a regular telephone to transmit. There is only one restriction on what the data packet can contain—the value 00 00 00 00 is generally discarded by the receiving switch software, so this value will not get through.

ANSI/EIA/TIA-552-1989, the electronic Industries Association's specification "Mobile Station—Land Station Compatibility Specification" describes the technical requirements for a mobile station to ensure compatibility and ability to obtain service in any (AMPS) cellular system. It lists basic radio requirements (modulation type, frequency range and stability, output power), as well as call processing procedures and the format of messages transferred between land and mobile stations. This specification is hereby incorporated by reference as if repeated herein in its entirety.

The over-the-air format of the Cellemetry transmission follows identically section 2.7.1 of the above referenced document, in order that the ESN data be received by the cellular carrier properly. It consists of a 10 kilobits/sec data stream burst, made up of a standard channel seizure precursor of 48 bits, and 5 repeats of each of the following: abbreviated address word, extended address word, and serial number word. This data burst is received by a cellular tower and receiver, demodulated, and sent to the Mobile Telephone Switching Office (MTSO) just as any other data packet from a voice telephone.

A cellular carrier who is Cellemetry-capable will have equipment installed in the MTSO to recover information from control channel transmissions received and processed by the telephone switching equipment. This Cellemetry "Gateway" equipment and software will parse out MINs which are designated as Cellemetry MINs and deliver the associated ESN, (the data packet), to the end customer in near-real-time over modems and standard dial-up phone lines.

Referring to FIG. 1, the existing cable power supply equipment 1 takes in power from the AC mains 2 to be stepped down to power a series of RF amplifiers 3 by the voltage regulator and invertor 5, and to keep the batteries 4 charged. When the AC power stops being supplied, the equipment 1 begins to generate power to run the amplifiers 3 from that stored in the batteries 4. The sensor 6 connects to strategic points in the equipment 1 and monitors them for change of status. It measures output voltage, battery voltage, and other values as required. When a change of status occurs, or voltages or other parameters fall out of preset boundary values, a message is transmitted on an RF link 7 at an 800 MHz frequency to a nearby cellular tower 8. The information packet contains a MIN identifying which of multiple sensors is reporting data, and an ESN containing the 32 bits of data and alarm information. This data broadcast is received by the Mobile Telephone Switching Office (MTSO) radio receivers 9, is demodulated and error corrected, then passed on to the cellular telephone switch 10. The switch 10 has been programmed to forward specific MIN registration messages out a separate port to a Cellemetry Gateway computer 11. The Gateway computer 11 stores the received ESNs in a data file on a hard disk in that computer 11. A user of the data service can dial into the modem bank 12 via the Public Switched Telephone Network (PSTN) 13 and retrieve the information. The user can also give the computer 11 a command to have the unit 6 paged via the radio link 7, which will cause it to send out an updated data packet. Some users, such as alarm companies, may remain dialed in to the gateway continuously in order to ensure the fastest possible response time. Others, such as electric meter reading companies, may connect once per day or once per week to download updated meter readings.

Figure 2:
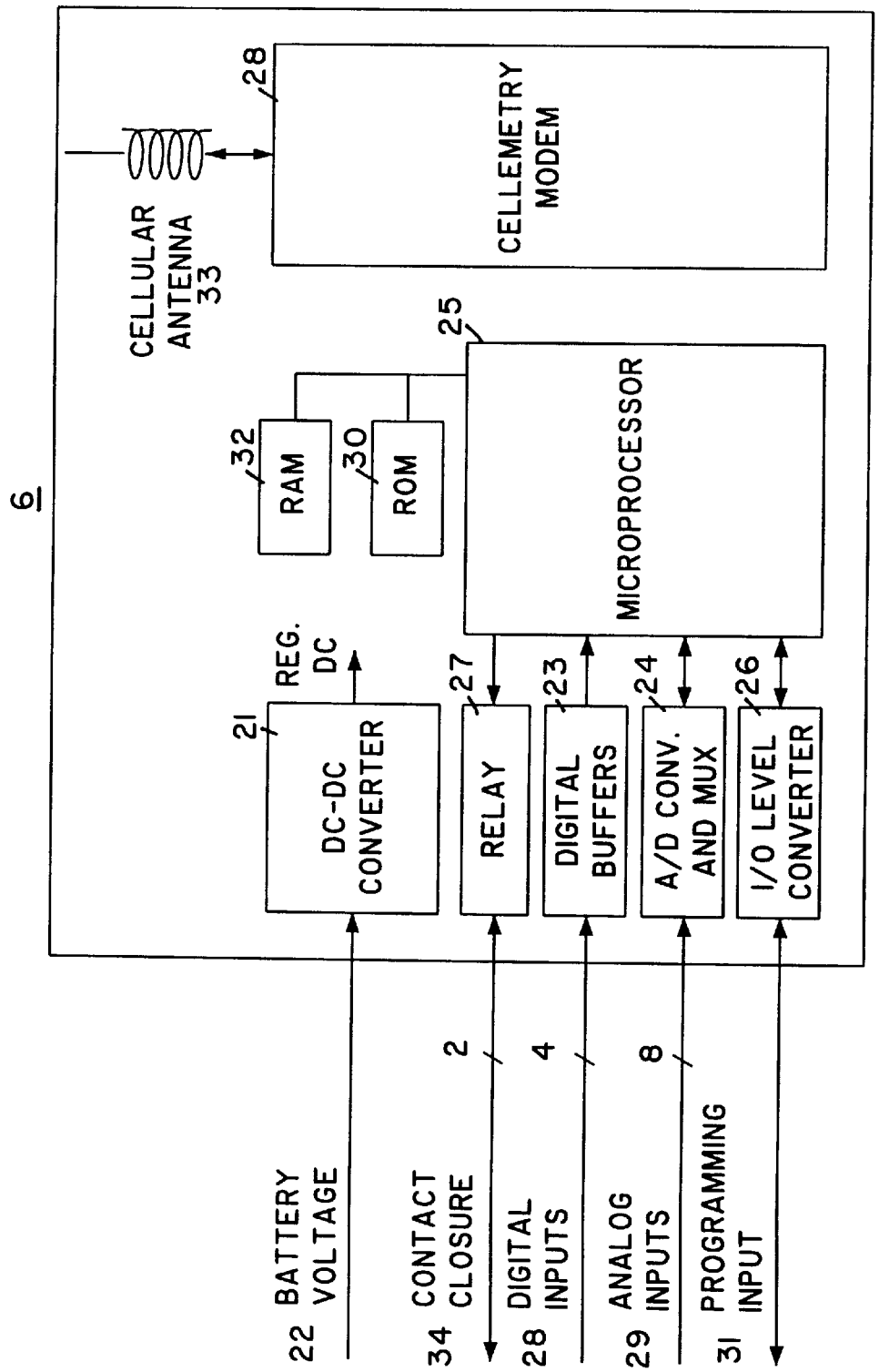
FIG. 2 is a block diagram of one embodiment of the wireless remote data sensor of the present invention.

Referring now to FIG. 2, the wireless remote data sensor 6 includes a power supply 21, which receives an input voltage 22 from an outside power source (monitored equipment batteries, not shown) regulates the voltage and distributes DC power to the internal components, i.e., the digital buffers 23, the AID and analog multiplexer 24, the microprocessor 25, the RS-232 I/O level converters 26, the contact closure relay 27, and the Cellemetry transceiver 28.

The Digital On/Off Sensor buffer or buffers 23 receive Digital Input or Inputs 28 from an external digital source (such as overtemperature alarms, undertemperature alarms, AC on/off, tamper alarms, or other alarms) and relay the change in state of the input to the Microprocessor 25. The Analog to Digital Converter and multiplexer 24 selects and converts one of up to eight Analog Input or Inputs 29 from external analog sources (such as AC voltage, AC current, low end pilot tone amplitude, high end pilot tone amplitude, or other performance indicators) and relays the digitally converted value of the selected analog input to the Microprocessor 25. The Microprocessor 25 contains a stored program in ROM 30 with instructions to send and receive information between itself and the Cellemetry Transceiver 28, as well as send and receive information between itself and the Programming Input 31, as well as receive information from the Digital On/Off Sensor or Sensors 28 and the Analog to Digital Converter and multiplexer 24. The Random Access Memory (RAM) 32 is used by the program to store temporary variables and other program-related information. The Cellemetry Transceiver 28 receives commands and data to transmit from the Microprocessor 25 by decoding signals received by the Cellular Antenna 33. The Microprocessor 25 can also command the Cellemetry Modem 30 to transmit a data packet using the same Cellular antenna 33. The Cellemetry Transceiver 30 also sends information to the Microprocessor 25 when pages for pre-programmed numbers have been received over the tuned cellular channel. Certain combinations/sequences of these numbers cause the microprocessor 25 to output a signal to the Relay 27 to cause it to change state, affecting the contact closure output 34. Ancillary values such as MINs and parameter thresholds are programmed into the Microprocessor 25 by connecting an external programming device to the Programming Input/Output 31 and establishing a communications link to the Microprocessor 25.

Figure 3:
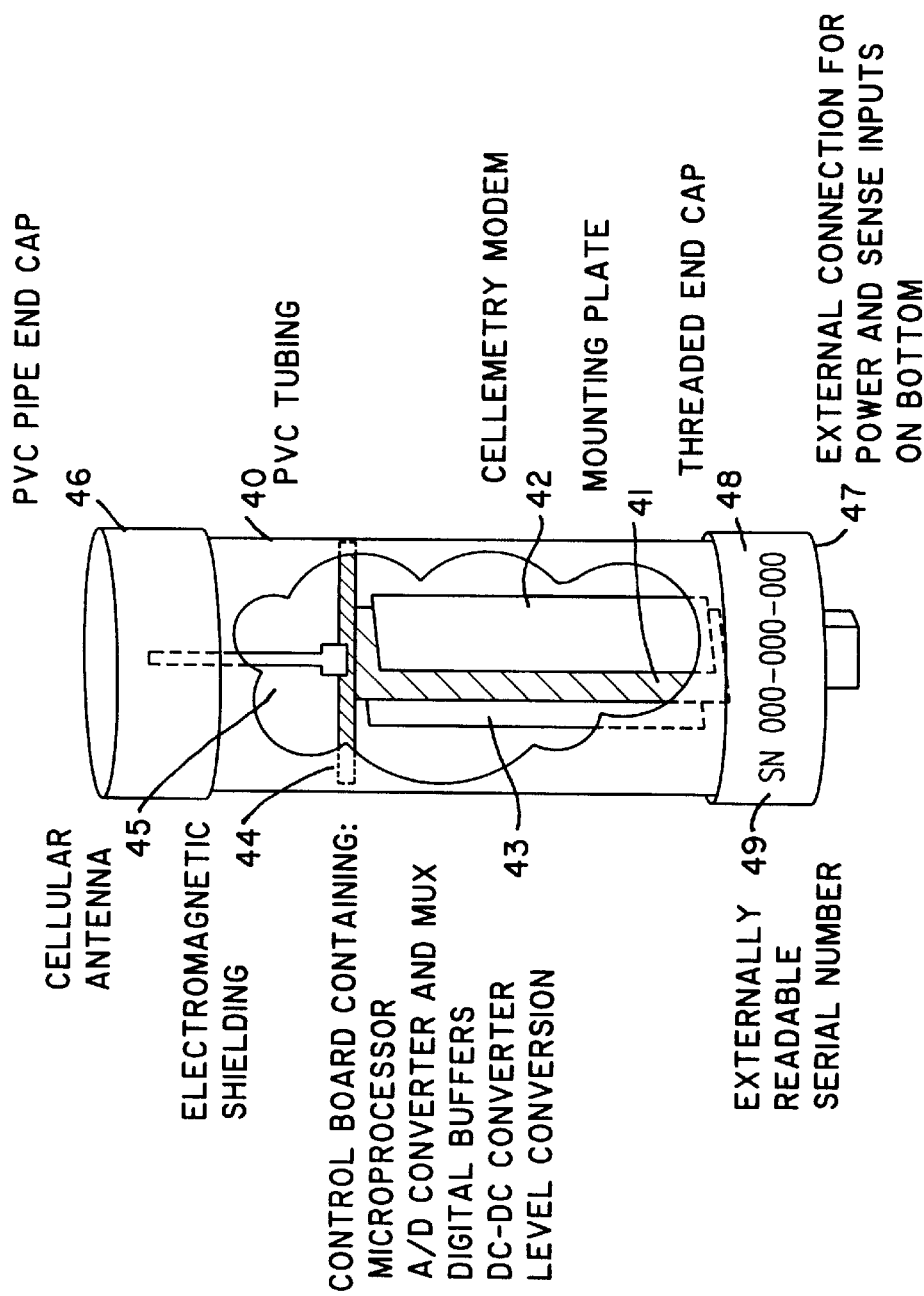
FIG. 3 is another embodiment of the present sensor, showing it packaged for mounting on a utility pole.

In FIG. 3, an embodiment according to the present invention for a pole-mounted package for the wireless remote data sensor 6 of the present invention, a PVC tube 40 encloses a mounting bracket 41 to which the Cellemetry Transceiver 42, the Microprocessor Board with Analog to Digital Converter(s), Digital On/Off Sensor(s), Power Supply and Input/Output 43, the electromagnetic shielding 44 and the Cellular Antenna 45 attach. The mounting bracket 41 itself is attached to the PVC Bottom End Cap 45, which screws to the bottom of the PVC Tubing 40. The PVC Top End Cap 46 is glued to the top of the PVC Tubing 40. A connector 47 is recessed into the bottom of the PVC Bottom End Cap 48 and receives a mating connector (not shown) which then connects to the voltage source and the device(s) to be monitored.

The field segment of the system incorporates two main components: the device (cable TV equipment) to be monitored, and the present invention. The resent invention runs on battery power, supplied by the monitored device, and has taps onto several key status and voltage points. One of several input conditions can cause the invention to transmit a specially formatted message over a cellular control channel. The MIN and ESN of this message will be separated from the standard mobile telephone traffic and transmitted to a customer's location via a land-line modem. Display software will alert the recipient of the data to changing conditions at the monitored point. Corrective action can then be taken.

The present invention contains several components, as shown in FIG. 2. Analog to Digital converters and buffers convert input signals to levels compatible with the microprocessor. The ROM in the microprocessor contains a stored, coded program.which instructs the microprocessor on its duties. This program makes the microprocessor periodically check the values (make analog to digital conversions) and states (digital) to make sure they are within limits or have not changed. In addition, the microprocessor communicates with the receiver section of the cellular transceiver over a serial data link to see if its MIN has been paged. A page would indicate that the monitored point's current values are requested by the end user. This polling operation continues until one of three conditions occurs: an out-of-specification level on an A/D converter, a change of state of one of the digital inputs, or a page message is received from the cellular transceiver.

If any of these conditions occurs, a new ESN is formatted which contains the current status data. This 32 bit number is sent to the cellular transceiver over the serial link, along with a message instructing the transceiver to transmit a registration using its programmed MIN and the new status ESN. The cellular transceiver tunes to the proper frequency, performs the error correction encoding, modulation, and other functions associated with an AMPS transmission, turns on the transmitter and sends out the data package.

A nearby cellular tower receives the transmission, demodulates it and forwards it to the cellular switch at the MTSO. The switch verifies that a good transmission was received (by comparing multiple retries of the same word, and by performing the AMPS standard error correcting protocol algorithms to the received symbols). If an uncorrupted transmission was received, a message is queued for transmission on the forward control channel which acknowledges the receipt of the message. If, within 10 seconds, the acknowledgment is not received by the invention's transceiver, multiple retries are attempted in accordance with the AMPS specification. Once an acknowledgment is received by the device from the switch, the invention returns to the polling state.

Special equipment and software in the switch separate out specific MINs, and forward the ESN received, along with the associated MIN, over a land-line modem to a customer's facility. There, the 32 bit number is broken down into the various parameters packed into the 32 bit number. In the current embodiment of the invention, the first 4 bits describe how the transmission was initiated (whether by a change in digital state, by an out-of-specification analog state, by a request received over the forward control channel, or a manual test registration). The next 4 bits represent the states of digital inputs. The remaining 24 bits are grouped as three sets of 8 bits and represent three 8 bit AID converter values.

A method for expanding the number of analog readings available is also described which would reduce the number of MINs required. Because more data points can be sampled than can be fit into the 32 bit transmitted ESN, the readings can presented in a format shown in FIG. 5 under program control. The Cellemetry modem as designed by Phillips has the ability to respond to up to 50 different MINs. However, the cellular carriers are initially reticent to assign many MINs to the same device, and encourage their judicious and sparing use.

In addition to being able to receive ESN values transmitted by a specific piece of equipment (identified by a unique MIN), the end user can also page the present invention over these same modem lines. The MIN will be sent out over the control channel, just as any other MIN would be. The transceiver in the invention is continuously monitoring and decoding the forward control channel, observing paged MINs. When a paged MIN matches its specific MIN, it informs the microprocessor in the invention, and a registration sequence is initiated. As mentioned previously, the Cellemetry modem can respond to up to 50 MINs. The ESN which is transmitted can vary depending on which MIN was received. In the case of the relay output, a sequence of two MINs is required to activate or deactivate the relay output.

Figure 4:
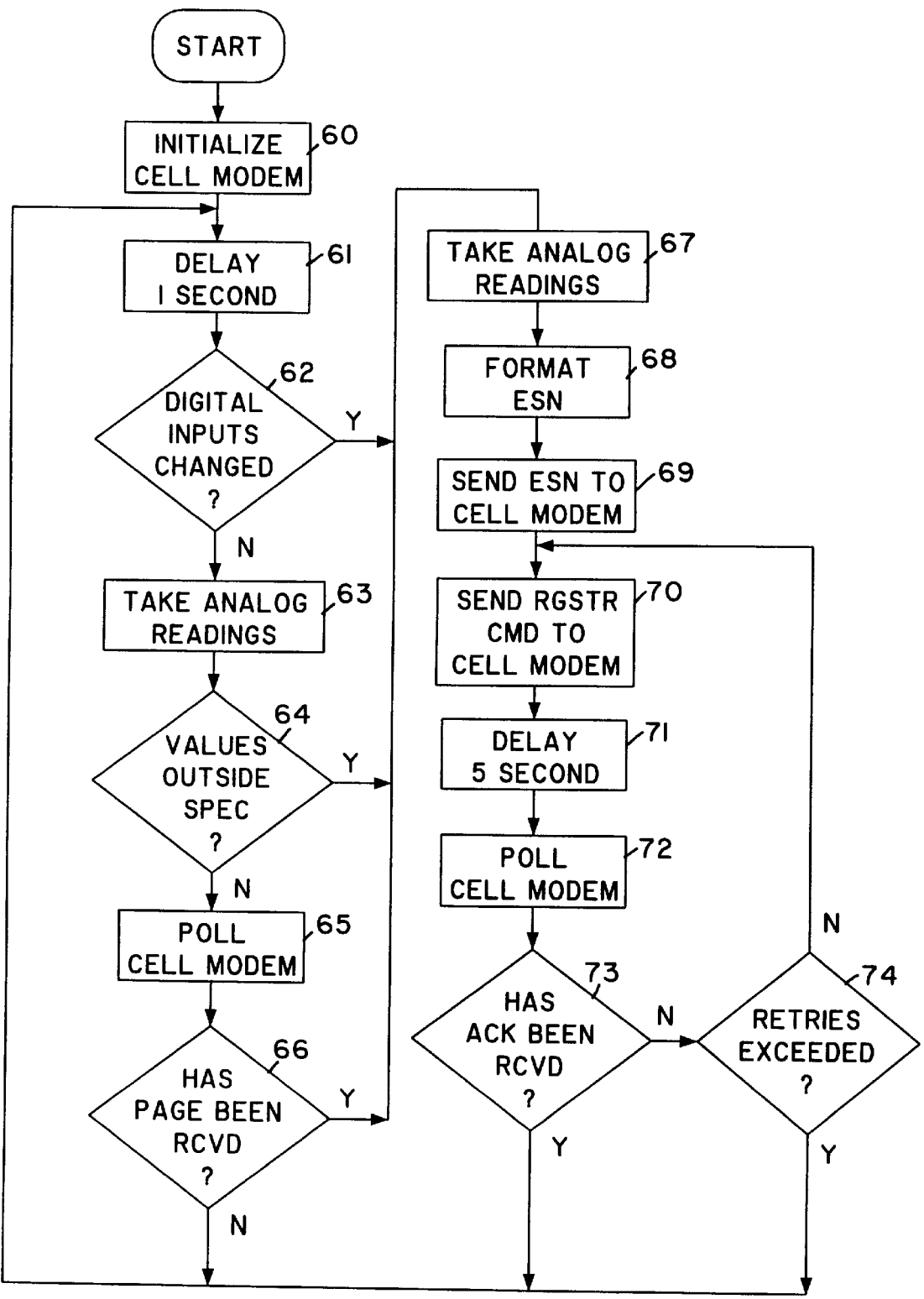
FIG. 4 is a flow chart that describes the operation of the microprocessor according to the present invention.

FIG. 4 depicts the programmatic flow of the software in the microprocessor 25. Upon application of power to the device, the microprocessor first initializes the Cellemetry modem in element 60. After a short delay 61, the Microprocessor checks the status of the digital inputs in element 62. If the digital inputs have changed, then the flow proceeds to take the analog readings in element 67. If not, the flow proceeds to element 63, where the analog readings are also taken. Element 64 compares the analog readings to specified values. If the analog values lie outside the desired tolerances, flow proceeds to element 67. If the values lie within the desired range, then flow proceeds to element 65, which checks the Cellemetry Modem to determine if the sensor has been queried by the operator. Element 66 decides if the modem's reply represents a.query. If the sensor has been queried, then flow proceeds to element 67. If not, flow loops back to element 33.

After the analog readings are taken in element 67, the microprocessor formats the ESN in element 68 using the current analog and digital values. The 32 bit response is sent as an ESN to the Cellemetry modem in element 69. Once the ESN is set, the microprocessor sends a "register" command to the modem in element 70 and waits for a short delay (element 71). Notably, this delay gives the modem a chance to transmit the data burst on the reverse control channel, the MTSO switch processor to decode the data, format an acknowledge message and to insert the acknowledge message into the forward control channel data stream, and the modem to receive and decode the acknowledge message. After this delay, the microprocessor polls the modem in element 72 to determine if an acknowledge was received. Element 73 checks the modem's response. If an acknowledge is received, then the flow returns to element 61. If no acknowledge was received during the short delay (element 71), the microprocessor 25 can loop to element 70 to send another transmission, until the number of retries (measured in element 74) has been exceeded. Once the number of retries has been exceeded, the microprocessor returns to element 61.

The entire assembly in FIG. 3 is 12.0 inches long and 3.0 inches in diameter. This unique assembly will easily mount on a utility pole, inside a cable conduit, or in any small place in the cable plant. Preferably, the assembly should be mounted above ground, to reduce RF path loss from the assembly to the cellular tower. Shielding can be effectively applied to the bottom half of the enclosure, while the top half remains RF-transparent to allow the antenna to radiate efficiently and to provide a weather-tight containment.

The present invention is a very low cost yet effective device for returning status information from the cable plant. By keeping the cost and size to a minimum, the present invention permits the cable system operator to monitor all critical equipment in the plant from a central facility to improve the system reliability, increase customer satisfaction, and reduce system down time. In addition, battery life can be extended by more periodic cycling, reducing costs. The battery discharge/cycling operation can occur automatically (at off-peak hours, if desired), rather than manually (personnel are no longer subject to voltage hazards or inclement weather). Overall, system outages due to power supply problems can be greatly reduced, and costs associated with maintaining the plant equipment can also be reduced.

What is claimed is:

1. An apparatus for sensing and transmitting information from remote equipment in a cable television plant, comprising:

a) at least one sensor for receiving at least one status signal from the remote equipment;

b) a processor being coupled to the at least one sensor and formatting a data signal indicative of the at least one status signal;

c) a modem being coupled to the processor; and d) a transmitter being coupled to the modem, and transmitting the data signal over a control channel of a cellular telephone network, wherein the modem has a plurality of mobile identification numbers to which it will respond, and said processor performs different functions depending upon which one of the plurality of mobile identification numbers is received by the modem.

2. The apparatus according to claim 1, wherein the at least one status signal received by the at least one sensor includes one or more of the following: battery backup power equipment status, power amplifier status, status of a plurality of switches, signal and pilot levels on the cable, voltage levels on the cable, and a status of the apparatus itself.

3. The apparatus according to claim 1, wherein said modem outputs the mobile identification number it received to the processor, which treats the mobile identification number as a command.

4. The apparatus according to claim 1, further comprising a switch, wherein said processor changes the state of the switch if a predetermined one of the plurality of mobile identification numbers was transmitted to the apparatus.

5. An apparatus for sensing and transmitting information from remote equipment in a cable television plant, comprising:
   a) at least one sensor for receiving at least one status signal from the remote equipment;
   b) a processor being coupled to the at least one sensor and formatting a data signal indicative of the at least one status signal;
   c) a modem being coupled to the processor; and
   d) a transmitter being coupled to the modem, and transmitting the data signal over a control channel of a cellular telephone network, wherein said processor converts the data signal into a digital signal having a predetermined bit length, which when transmitted is treated by the cellular network as the electronic serial number of the apparatus.

6. An apparatus for sensing and transmitting information from remote equipment in a cable television plant, comprising:
   a) at least one sensor for receiving at least one status signal from the remote equipment;
   b) a processor being coupled to the at least one sensor and formatting a data signal indicative of the at least one status signal;
   c) a modem being coupled to the processor; and
   d) a transmitter being coupled to the modem, and transmitting the data signal over a control channel of a cellular telephone network, wherein said processor formats the data signal as a dialed digit message, which is then transmitted over the control channel of the cellular network.

7. An apparatus for sensing and transmitting information from remote equipment in a cable television plant, comprising:
   a) at least one sensor for receiving at least one status signal from the remote equipment;
   b) a processor being coupled to the at least one sensor and formatting a data signal indicative of the at least one status signal;
   c) a modem being coupled to the processor; and
   d) a transmitter being coupled to the modem, and transmitting the data signal over a control channel of a cellular telephone network, wherein said processor formats the data signal in one of a plurality of predetermined formats, and cycles through the formats each time the apparatus is queried.

8. An apparatus for sensing and transmitting information from remote equipment in a cable television plant, comprising:
   a) at least one sensor for receiving at least one status signal from the remote equipment;
   b) a processor being coupled to the at least one sensor and formatting a data signal indicative of the at least one status signal;
   c) a modem being coupled to the processor; and
   d) a transmitter being coupled to the modem, and transmitting the data signal over a control channel of a cellular telephone network, wherein said processor commands the modem to place a call and transmit the data signal upon a change of state of one of the status signals that is a digital signal.

9. An apparatus for sensing and transmitting information from remote equipment in a cable television plant, comprising:
   a) at least one sensor for receiving at least one status signal from the remote equipment;
   b) a processor being coupled to the at least one sensor and formatting a data signal indicative of the at least one status signal;
   c) a modem being coupled to the processor; and
   d) a transmitter being coupled to the modem, and transmitting the data signal over a control channel of a cellular telephone network, wherein said processor commands the modem to place a call and transmit the data signal when one of the status signals that is an analog signal changes to a value outside a predetermined range.

10. An apparatus for sensing and transmitting information from remote equipment in a cable television plant, comprising:
    a) at least one sensor for receiving at least one status signal from the remote equipment;
    b) a processor being coupled to the at least one sensor and formatting a data signal indicative of the at least one status signal;
    c) a modem being coupled to the processor; and
    d) a transmitter being coupled to the modem, and transmitting the data signal over a control channel of a cellular telephone network, wherein the processor polls all equipment it is monitoring immediately and updates the data signal prior to sending the data signal to the modem for transmission.

11. An apparatus for sensing and transmitting information from remote equipment in a cable television plant, comprising:
    a) at least one sensor for receiving at least one status signal from the remote equipment;
    b) a processor being coupled to the at least one sensor and formatting a data signal indicative of the at least one status signal;
    c) a modem being coupled to the processor; and
    d) a transmitter being coupled to the modem, and transmitting the data signal over a control channel of a cellular telephone network, wherein said processor prevents the data signal from transmitting any unallowed values.

12. The apparatus according to claim 11, wherein the unallowed values include all zeros.

13. A method for sensing and transmitting information from remote equipment in a cable television plant with a remote sensing apparatus, comprising the steps of:
   a) sensing at least one status signal from the remote equipment;
   b) formatting a data signal indicative of the at least one status signal in a predetermined digital format;
   c) transmnitting the data signal over a control channel of a cellular telephone network; and
   d) controlling operation of the remote sensing apparatus by using a plurality of different mobile identification numbers.

14. The method according to claim 13, further comprising the step of:
   e) treating each of the plurality of mobile identification numbers as a different command.

15. The method according to claim 13, further comprising the step of:
   e) changing a state of a switch in the remote sensing apparatus if a predetermined one of the plurality of mobile identification numbers was received by the apparatus.

16. The method according to claim 13, further comprising the step of:
   e) transmitting the data signal upon a change of state of one of the status signals that is a digital signal.

17. The method according to claim 13, further comprising the step of:
   e) transmitting the data signal when one of the status signals that is an analog signal changes to a value outside a predetermined range.

18. A method for sensing and transmitting information from remote equipment in a cable television plant with a remote sensing apparatus, comprising the steps of:
   a) sensing at least one status signal from the remote equipment;
   b) formatting a data signal indicative of the at least one status signal in a predetermined digital format;
   c) transmitting the data signal over a control channel of a cellular telephone network; and
   d) using a plurality of different mobile identification numbers to query the remote sensing apparatus.

19. A method for sensing and transmitting information from remote equipment in a cable television plant with a remote sensing apparatus, comprising the steps of:
   a) sensing at least one status signal from the remote equipment;
   b) formatting a data signal indicative of the at least one status signal in a predetermined digital format;
   c) transmitting the data signal over a control channel of a cellular telephone network; and
   d) cycling through a series of predetermined formats of the data signal each time the remote sensing apparatus is paged.

20. A method for sensing and transmitting information from remote equipment in a cable television plant with a remote sensing apparatus, comprising the steps of:
   a) sensing at least one status signal from the remote equipment;
   b) formatting a data signal indicative of the at least one status signal in a predetermined digital format; and
   c) transmitting the data signal over a control channel of a cellular telephone network, wherein the step a) of sensing further comprises sensing battery backup power equipment status, power amplifier status, status of switches, signal and pilot levels on the cable, voltage levels on the cable, and a status of the remote sensing apparatus itself.

21. A method for sensing and transmitting information from remote equipment in a cable television plant with a remote sensing apparatus, comprising the steps of:
   a) sensing at least one status signal from the remote equipment;
   b) formatting a data signal indicative of the at least one status signal in a predetermined digital format;
   c) transmitting the data signal over a control channel of a cellular telephone network;
   d) polling all equipment being monitored immediately before transmitting the data signal; and
   e) updating the data signal prior to transmitting it.

22. A method for sensing and transmitting information from remote equipment in a cable television plant with a remote sensing apparatus, comprising the steps of:
   a) sensing at least one status signal from the remote equipment;
   b) formatting a data signal indicative of the at least one status signal in a predetermined digital format;
   c) transmitting the data signal over a control channel of a cellular telephone network; and
   d) preventing the data signal from being all zeros.

23. A device for monitoring remote equipment comprising:
   a) means for sensing status signals from the remote equipment;
   b) means for formatting the sensed status signals into a digital signal;
   c) means for transmitting the digital signal over a control channel of a cellular telephone network; and
   d) means for commanding the device by using a plurality of mobile identification numbers.

24. The device according to claim 23, further comprising means for changing the format of the digital signal according to which of the plurality of mobile identification numbers the device is responding.

25. The device according to claim 23, further comprising means for controlling the remote equipment in response to a predetermined one of the plurality of mobile identification numbers received by the device.

* * * * *